United States Patent
Lecarpentier et al.

(10) Patent No.: US 12,412,458 B2
(45) Date of Patent: Sep. 9, 2025

(54) METHOD FOR DETECTING THE ABSENCE OF A PHYSICAL ELEMENT IN A GEOGRAPHICAL ZONE, AND ASSOCIATED SYSTEM

(71) Applicant: ORANGE, Issy les Moulineaux (FR)

(72) Inventors: François-Xavier Lecarpentier, Chatillon (FR); Dinh Thuy Phan Huy, Chatillon (FR); Guillaume Tardiveau, Chatillon (FR)

(73) Assignee: ORANGE, Issy les Moulineaux (FR)

( * ) Notice: Subject to any disclaimer, the term of this patent is extended or adjusted under 35 U.S.C. 154(b) by 108 days.

(21) Appl. No.: 18/549,637

(22) PCT Filed: Mar. 10, 2022

(86) PCT No.: PCT/FR2022/050432
§ 371 (c)(1),
(2) Date: Sep. 8, 2023

(87) PCT Pub. No.: WO2022/195201
PCT Pub. Date: Sep. 22, 2022

(65) Prior Publication Data
US 2024/0153365 A1    May 9, 2024

(30) Foreign Application Priority Data
Mar. 16, 2021 (FR) ........................................ 2102586

(51) Int. Cl.
*G08B 13/14* (2006.01)
(52) U.S. Cl.
CPC .................................. *G08B 13/1481* (2013.01)
(58) Field of Classification Search
None
See application file for complete search history.

(56) References Cited

U.S. PATENT DOCUMENTS

| | | | |
|---|---|---|---|
| 6,294,777 B1 * | 9/2001 | Shteynberg | G01V 8/20 |
| | | | 250/221 |
| 10,262,295 B2 | 4/2019 | Sharp, Jr. | |

(Continued)

FOREIGN PATENT DOCUMENTS

| | | | | |
|---|---|---|---|---|
| CN | 105603913 A | * | 5/2016 | ............ E01F 13/042 |
| CN | 208241394 U | * | 12/2018 | |

(Continued)

OTHER PUBLICATIONS

International Search Report dated May 9, 2022 for corresponding International Application No. PCT/FR2022/050432, filed Mar. 10, 2022.

(Continued)

*Primary Examiner* — Fekadeselassie Girma
(74) *Attorney, Agent, or Firm* — David D. Brush; Westman, Champlin & Koehler, P.A.

(57) ABSTRACT

A method for transmitting a message by ambient scattering. The method is implemented by a transmitting device in response to the transmitting device changing from a first state in which the transmitting device is deprived from illumination to a second state in which the transmitting device is illuminated by at least one light source. The method includes: obtaining an amount of electrical energy stored from light energy; comparing the amount of electrical energy stored with a given threshold, the threshold representing an electrical energy quantity sufficient to allow transmission of a message by ambient scattering; and in response to the threshold being overrun, transmitting a message called "information message", representative of the threshold overrun, the transmission being implemented by using the stored electrical energy.

10 Claims, 2 Drawing Sheets

(56) References Cited

U.S. PATENT DOCUMENTS

| | | | |
|---|---|---|---|
| 10,601,250 B1* | 3/2020 | Oh | H02J 50/12 |
| 2002/0044277 A1* | 4/2002 | Yonezawa | G01N 21/95623 |
| | | | 356/237.2 |
| 2005/0285445 A1* | 12/2005 | Wruck | H02J 9/002 |
| | | | 307/10.1 |
| 2006/0071774 A1 | 4/2006 | Brown et al. | |
| 2006/0148596 A1* | 7/2006 | Kitson | A63B 71/022 |
| | | | 473/436 |
| 2013/0134615 A1* | 5/2013 | Wilfong, Jr. | B29C 49/28 |
| | | | 264/40.3 |
| 2014/0263634 A1* | 9/2014 | Iqbal | G16H 40/20 |
| | | | 235/385 |
| 2014/0267774 A1* | 9/2014 | Holz | G01S 3/7864 |
| | | | 348/169 |
| 2016/0247091 A1* | 8/2016 | McCaffrey | G06F 40/40 |
| 2017/0093228 A1* | 3/2017 | Fisher | H02J 7/35 |
| 2017/0223807 A1* | 8/2017 | Recker | H02J 13/00006 |
| 2018/0014095 A1* | 1/2018 | Tanaka | H04B 10/50 |
| 2018/0062442 A1* | 3/2018 | Qiu | H02J 50/12 |
| 2018/0339873 A1* | 11/2018 | Yamauchi | B65H 3/06 |
| 2019/0015747 A1* | 1/2019 | Thompson | A63F 13/53 |
| 2020/0096669 A1* | 3/2020 | McCord | F21V 3/02 |
| 2020/0121428 A1* | 4/2020 | Pai | A61C 17/227 |
| 2022/0146670 A1* | 5/2022 | Sanchez | G02B 5/0278 |
| 2022/0371825 A1* | 11/2022 | Gravelle | G05D 1/0291 |
| 2022/0385375 A1* | 12/2022 | Rekhi | H04B 5/77 |
| 2024/0369601 A1* | 11/2024 | Zbinden | G02F 1/0136 |

FOREIGN PATENT DOCUMENTS

| | | | |
|---|---|---|---|
| CN | 112267736 A | * | 1/2021 |
| CN | 112512162 A | * | 3/2021 |

OTHER PUBLICATIONS

Written Opinion of the International Searching Authority dated May 9, 2022 for corresponding International Application No. PCT/FR2022/050432, filed Mar. 10, 2022.

French Search Report and Written Opinion dated Nov. 26, 2021 for corresponding French Application No. 2102586, filed Mar. 16, 2021.

Van Huynh Nguyen et al., "Ambient Backscatter Communications: A Contemporary Survey", IEEE Communications Surveys & Tutorials, vol. 20, No. 4, Oct. 1, 2018 (Oct. 1, 2018), p. 2889-2922, XP011698260.

English translation of the Written Opinion of the International Searching Authority dated May 9, 2022 for corresponding International Application No. PCT/FR2022/050432, filed Mar. 10, 2022.

* cited by examiner

METHOD FOR DETECTING THE ABSENCE OF A PHYSICAL ELEMENT IN A GEOGRAPHICAL ZONE, AND ASSOCIATED SYSTEM

CROSS-REFERENCE TO RELATED APPLICATIONS

This Application is a Section 371 National Stage Application of International Application No. PCT/FR2022/050432, filed Mar. 10, 2022, which is incorporated by reference in its entirety and published as WO 2022/195201 A1 on Sep. 22, 2022, not in English.

FILED OF THE DISCLOSURE

The present invention belongs to the general field of the monitoring of a given geographical area. It relates, in particular, to a method for detecting the absence of a given physical element in a determined geographical area, as well as a system configured to implement said detection method. The invention finds a particularly advantageous application, although without limitation, for the management (both in terms of stocks and of effective availability "off-the-shelf") of physical objects, for example within a factory workshop or a shop.

BACKGROUND OF THE DISCLOSURE

Nowadays, there is a multitude of application contexts in which it is important to be able to determine whether a given physical element is absent from a determined geographical area, even though this physical element was previously present/is expected to be present in said geographical area.

For example, it is possible to mention the case of a shop offering for sale items distributed on racks (example: a home appliance store). A given item (possibly each item offered for sale by this shop) occupies a determined place on a rack and, when the item in question is no longer available (typically because a customer has just grabbed it to buy it), the rack should be restocked so that the concerned item can be offered for sale again. If ever, the item is no longer available in stock, then it should be ordered.

Of course, this is only an example given for purely illustrative purposes, and there may be multiple reasons why a physical element previously present in a determined geographical area is now absent: disappearance (example: theft), purchase, removal for time-limited use, moving (example: a moved piece of furniture to modify the layout of a room), etc.

It is understood that the determination of this absence must advantageously be able to be done remotely, that is to say without it being necessary to deploy human resources dedicated to the permanent visual control of the concerned geographical area and able to issue, if necessary, an alert reflecting the absence of the monitored physical element.

To this end, a first approach consists in using image and/or video acquisition means configured to monitor a geographical area associated with a physical element. In addition to these acquisition means, there is also the use of pattern recognition algorithms making it possible to identify the presence or absence of the physical element in the acquired images and/or videos.

It should however be noted that, even if this first approach makes it possible to avoid the use of human resources dedicated to monitoring, a certain number of disadvantages remains inherent in its implementation. Particularly, the fact of acquiring images/videos presents risks in terms of preserving the privacy of persons likely to take possession of the physical element. Moreover, from a technical point of view, the implementation of said pattern recognition algorithms is a particularly complex task. It indeed requires significant computing resources as well as the use of machine learning techniques.

A second approach falls within the context of the IoT (Internet of Things) and is based on the ever-increasing deployment of communicating objects in everyday life. More specifically, this second approach, restricted to the use case aiming to detect the presence or absence of a physical element on a rack in a closed environment (typically a shelf in a store), consists in the use of a laser sensor. The physical element whose presence/absence is sought is lit by a laser beam emitted by the laser sensor, the latter measuring in return the light reflected by said physical element. The presence/absence of the physical element is deduced from this light measurement, and the result is communicated, via a wireless communication network deployed in said closed environment, to target user terminals (typically Smartphones belonging to employees of a store and equipped with a dedicated software application).

Although less complex to implement than the first approach, and also more respectful of privacy since no image/video acquisition is required, the second approach itself has flaws which, in practice, strongly constrain its use. Indeed, on the one hand, the use of laser beams, even controlled, is systematically associated with a risk of exposure of people living in the vicinity of the geographical area in which the presence/absence of the physical element is sought. And on the other hand, the second approach requires the laser sensor to operate permanently, which makes it particularly energy-intensive. Finally, the second approach is also particularly expensive because of the use of said laser sensor.

SUMMARY

According to a first aspect, the invention relates to a method for transmitting a message intended to allow the detection of the absence of a given physical element in a determined geographical area, said physical element being able to be associated with two distinct states:
- a first state in which it is present in the geographical area so that a transmitting device is deprived of illumination coming from at least one given light source,
- a second state in which it is absent from the geographical area so that the transmitting device is illuminated by at least one light source among said at least one light source.

Furthermore, said method is implemented by the transmitting device when the physical element changes from the first state to the second state and includes steps of:
- obtaining a stock of electrical energy from light energy,
- comparing the amount of electrical energy stored with a given threshold,
- when said threshold is overrun, transmitting a message called "information message", representative of said threshold overrun, said transmission step being implemented by using the stored electrical energy.

Thus, and in accordance with the invention, when the electrical energy recovered and stored by the transmitting device has reached a given threshold, the transmitting device is able to transmit an information message representative of said threshold overrun.

No limitation is attached to the content of said information message, since it is representative of said threshold overrun, and therefore makes it possible, a fortiori, to report the absence of the physical element (indeed, if the physical element was still present, that is to say in the first state, then the information message would not be transmitted).

For example, it may be a message indicating that the transmitting device is in the "illuminated" state (i.e. the physical element is in the second state).

The electrical energy that allows the operation of the transmitting device (to perform at least the transmission step) comes from the conversion of the light energy provided by said at least one light source. In other words, to implement the transmission step, the transmitting device is powered from an external energy (i.e. said light energy) and only when the physical element is in the second state. Such arrangements are particularly advantageous in that they make the invention particularly energy efficient, in comparison with the solutions of the state of the art which require a permanent energy supply.

Furthermore, the detection method according to the invention does not require the acquisition of images/videos from the environment in which the physical element is located, and thus provides perfect guarantees with regard to respect for privacy.

Finally, the detection method according to the invention is also advantageous in that it does not require the use of expensive materials/elements/devices, such as for example a laser sensor. Indeed, the means for capturing light energy to finally convert it into electrical energy are not only well known to those skilled in the art but also easily available at lower cost.

In particular modes of implementation, the transmission method can further include one or more of the following characteristics, taken separately or in all technically possible combinations.

In particular modes of implementation, the comparison step is also implemented by using the stored electrical energy.

Proceeding in this way offers the possibility of envisaging implementations involving an internal clock to the transmitting device, so that the transmission of the information message is triggered only when the threshold is exceeded for a determined duration. As a variant or in addition, it can also be envisaged to stop the transmission of the information message when the amount of stored energy falls below said threshold or another threshold for a duration equal to or different from said determined duration. Such arrangements are advantageous in that they contribute to setting up a hysteresis that makes it possible to avoid triggering unwanted transmissions of messages.

In particular modes of implementation, the transmission of the information message is carried out by emission of a radio signal.

In particular modes of implementation, the transmission of the information message is carried out by ambient backscatter.

The ambient backscatter technology is particularly attractive because no additional radio wave is emitted by the transmitting device (in the sense of a wave other than the wave coming from an ambient signal which is backscattered to transmit the information message). Such arrangements are therefore particularly advantageous given that the energy cost of a communication is thereby optimized, which is in particular important in the current context of the IoT where each object of everyday life is intended to become a communicating object.

According to a second aspect, the invention relates to a communication method implemented by a receiving device and including steps of:
  receiving a message called "information message", representative of the overrun of a given threshold by an amount of electrical energy stored by a transmitting device, said information message being transmitted by said transmitting device,
  transmitting, to at least one communication terminal, a message called "alert message", representative of said threshold overrun.

According to a third aspect, the invention relates to a method for detecting the absence of a given physical element in a determined geographical area, said physical element being able to be associated with two distinct states:
  a first state in which it is present in the geographical area so that a transmitting device is deprived of illumination coming from at least one given light source,
  a second state in which it is absent from the geographical area so that the transmitting device is illuminated by at least one light source among said at least one light source.

Furthermore, said detection method is implemented when the physical element changes from the first state to the second state and includes steps of:
  implementing a method for transmitting a message according to the invention, so that a message called "information message", is transmitted by the transmitting device,
  receiving said information message by at least one receiving device.

Of course, the communication and detection methods inherit the same advantages as those mentioned above for the transmission method.

In particular modes of implementation, said detection method further includes, following the receipt of the information message, a step of transmitting, to at least one communication terminal, a message, called "alert message", representative of said threshold overrun.

In particular modes of implementation, the communication method or the detection method can further include one or more of the following characteristics, taken separately or in all technically possible combinations.

In particular modes of implementation, the alert message includes at least one data characteristic of the transmitting device.

Said at least one data offers the possibility of facilitating the identification of the transmitting device, and therefore a fortiori also that of the missing physical element. By way of non-limiting example, said at least one data corresponds to an identifier or to a location of the transmitting device.

According to a fourth aspect, the invention relates to a computer program including instructions for implementing a transmission method according to the invention or a communication method according to the invention when said computer program is executed by a computer.

This program can use any programming language, and be in the form of source code, object code or intermediate code between source code and object code, such as in a partially compiled form, or in any other desirable form.

According to a fifth aspect, the invention relates to a computer-readable information or recording medium on which a computer program according to the invention is recorded.

The information or recording medium can be any entity or device capable of storing the program. For example, the medium can include a storage means, such as a ROM, for example a CD ROM or a microelectronic circuit ROM, or a magnetic recording means for example a hard disk.

On the other hand, the information or recording medium can be a transmissible medium such as an electrical or optical signal, which can be conveyed via an electrical or optical cable, by radio or by other means. The program according to the invention can be particularly downloaded from an Internet-type network.

Alternatively, the information or recording medium can be an integrated circuit in which the program is incorporated, the circuit being adapted to execute or to be used in the execution of the method in question.

According to a sixth aspect, the invention relates to a transmitting device including:
- means for obtaining a stock of electrical energy from light energy,
- a comparison module configured to compare the amount of electrical energy stored with a given threshold,
- a transmission module configured to transmit, when the amount of stored electrical energy is greater than said threshold, a message called "information message", representative of said threshold overrun.

Furthermore, said transmission module operates by using the stored electrical energy.

In particular embodiments, the comparison module also operates by using the stored electrical energy.

According to a seventh aspect, the invention relates to a receiving device including:
- a receiving module configured to receive a message called "information message", representative of an overrun of a threshold given by an amount of electrical energy stored by a transmitting device, said information message being transmitted by said transmitting device,
- a transmission module configured to transmit, to at least one communication terminal, a message called "alert message", representative of said threshold overrun.

According to an eighth aspect, the invention relates to a system for detecting the absence of a given physical element in a determined geographical area, said system including a transmitting device according to the invention and a receiving device according to the invention, said physical element being able to be associated with two distinct states:
- a first state in which it occupies the geographical area so that said transmitting device is deprived of illumination coming from at least one given light source,
- a second state in which it is absent from the geographical area so that the transmitting device is illuminated by at least one light source among said at least one light source.

BRIEF DESCRIPTION OF THE DRAWINGS

Other characteristics and advantages of the present invention will become apparent from the description given below, with reference to the appended drawings which illustrate an exemplary embodiment devoid of any limitation. In the figures.

DETAILED DESCRIPTION OF ILLUSTRATIVE EMBODIMENTS

Figure 1:
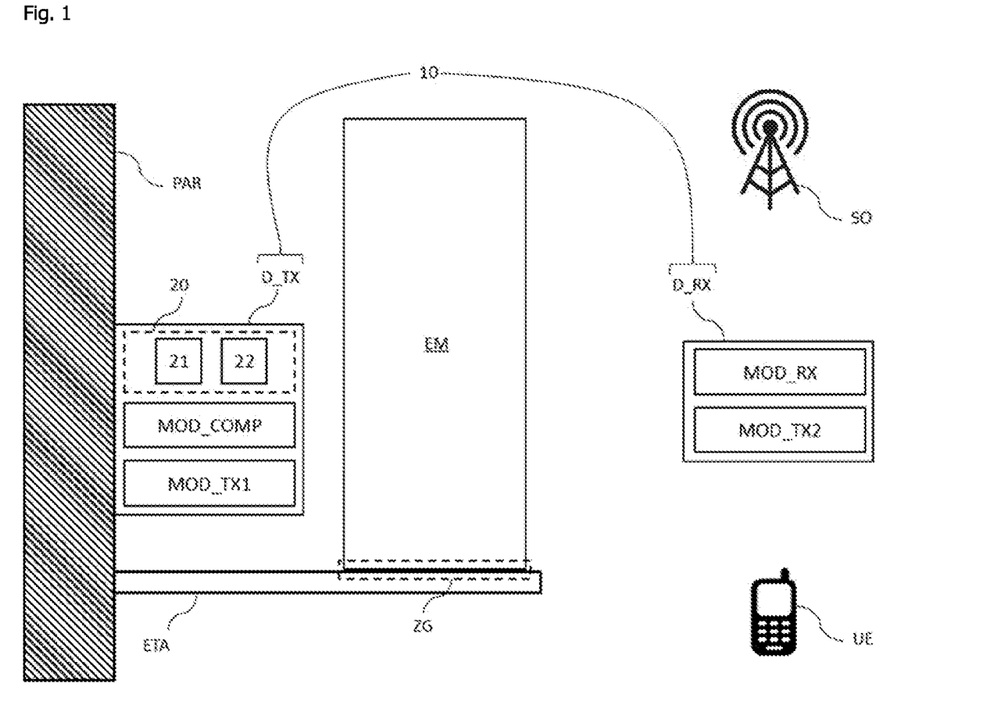
FIG. 1 schematically represents, in its environment, one particular embodiment of a system for detecting the absence of a physical element according to the invention.

FIG. 1 schematically represents, in its environment, one particular embodiment of a system according to the invention.

In accordance with the invention, the system 10 is configured to carry out processing operations making it possible to detect the absence of a given physical element EM in a determined geographical area ZG, by implementing an absence detection method according to the invention.

The remainder of the description more specifically aims the case of a physical element EM corresponding to an object of a given type proposed for sale in a store (for example a computer screen in a store selling products dedicated to IT). When said physical element EM is offered for sale, and it has not yet been sold (or stolen, or withdrawn from sale due to a defect, etc.), it is arranged on an shelf ETA of the store, so as to occupy a determined geographical area ZG corresponding to a specific location of said shelf ETA. It is noted that in practice, said geographical area ZG is located at the level of a label fixed to said shelf ETA and displaying the selling price of said physical element EM.

For the remainder of the description, it is also considered, as illustrated by FIG. 1 without limitation, that a single physical element EM is positioned at the level of said geographical area ZG, which is therefore more specifically defined as being substantially equal to the contact surface between the physical element EM and the shelf ETA. In other words, in the configuration considered here, the geographical area ZG is not intended to accommodate a plurality of objects of the type of said physical element EM between the wall PAR to which the shelf ETA is fixed and the edge of the shelf ETA opposite to said wall PAR.

It is important to note that the invention is in no way limited to a configuration (positioning of the physical element, nature of the physical element, number of objects of the type of the physical element, etc.) as described in the remainder of the description with reference to FIG. 1. Indeed, the invention is also applicable in many other configurations, several examples of which are explained later. Furthermore, nothing excludes considering a geographical area that is other than a surface, such as a volume of the space.

The system 10 includes a transmitting device D_TX. In the embodiment of FIG. 1, said transmitting device D_TX is fixedly arranged on the wall PAR to which the shelf ETA is fixed. The position of the transmitting device D_TX is a relative position with respect to the physical element EM. More particularly, the transmitting device D_TX and the physical element EM are arranged so that it is possible to associate with said physical element EM two distinct states:
- a first state ST_1 in which it is present in said geographical area ZG (as illustrated in FIG. 1), so that the transmitting device D_TX is deprived of illumination coming from two given light sources distinct from said transmitting device D_TX (i.e. the light waves coming from said two light sources are not able to reach the transmitting device D_TX),
- a second state ST_2 in which it is absent from said geographical area ZG (because it has been sold, or stolen, or withdrawn from sale due to a defect, etc.), so that the transmitting device D_TX is illuminated by at least one light source among said two light sources (i.e. the light waves coming from at least one of said two light sources are able to reach the transmitting device D_TX).

In the embodiment of FIG. 1, the two light sources (not represented in the figures) correspond to:
ambient lighting resulting from luminaires disposed in the store,
natural lighting (sunlight, also called natural light) penetrating into the store through glazed elements.

It is therefore understood that the two states ST_1, ST_2 associated with the physical element EM also refer, in an equivalent manner, to two states respectively associated with the transmitting device D_TX, namely: a first state in which the physical element is considered to be masked (darkened, deprived of illumination) with respect to said two light sources, and a second state in which the physical element is illuminated by at least one of said two light sources.

It is important to note that the fact of considering two light sources for the definition of the two states of the physical element EM constitutes only one variant of implementation of the invention.

For example, in another variant of the embodiment of FIG. 1, a single light source may be considered corresponding to the ambient lighting coming from the luminaires, when said store corresponds for example to a closed environment deprived of natural illumination (for example of the hangar type without a glazed element).

In general, no limitation is attached to the number of light sources that can be considered in the context of the present invention, since these correspond to light sources which are expected to be able to illuminate the transmitting device D_TX due to the absence of the physical element EM (second state ST_2 of said physical element EM). Thus, within the meaning of the present invention, the expression "given light source" does not refer to a light source that would be intentionally or accidentally positioned so as to be able to light the transmitting device D_TX even though the physical element EM is still present (for example a light source arranged between the transmitting device D_TX and the physical element EM).

As illustrated in FIG. 1, the transmitting device D_TX includes means 20 for obtaining a stock of electrical energy from light energy. Conventionally, such obtaining means include:
means 21 for converting light energy into electrical energy,
means 22 for storing said electrical energy.

For example, said means 21 for converting light energy into electrical energy correspond to one or more photovoltaic cells disposed so as to form, at least partly, one face of the transmitting device D_TX. Said face is intended to be placed facing the physical element EM, so that the photovoltaic cells can be illuminated when the physical element EM is absent. Said means 21 for converting light energy into electrical energy can further comprise physical means of design known per se to perform determined electronic functions, such as for example an amplification of an electrical signal delivered by the photovoltaic cell(s). Finally, the storage means 23 correspond for example to a battery fitted to the transmitting device D_TX.

Of course, the previous example in which the means 21 and 22 correspond respectively to one or more photovoltaic cells and an electric battery has been given for illustrative purposes only. In general, any means configured to obtain a stock of electrical energy from light energy and known to those skilled in the art can be envisaged (one or more flexible films using semiconductor compounds based on organic polymers, etc.).

Furthermore, the transmitting device D_TX is also configured to perform processing operations aimed at reporting the absence of the physical element EM, by implementing a method for transmitting a message according to the invention.

In the present embodiment, the implementation of said transmission method is made possible thanks to the electrical energy accumulated by the transmitting device D_TX, due to the absence of the physical element EM. In other words, the transmitting device D_TX includes circuits dedicated to the implementation of said transmission method and which are self-powered by said electrical energy stored in said storage means 22.

In this way, when the stored electrical energy has reached a given threshold TH, the transmitting device D_TX is able to transmit an information message MESS_INFO representative of said threshold TH overrun.

No limitation is attached to the content of said information message MESS_INFO, since it is representative of said threshold overrun, and therefore makes it possible, a fortiori, to report the absence of the physical element EM. For example, it may be a message indicating that the transmitting device D_TX is in the "illuminated" state (i.e. the physical element is in the second state ST_2).

No limitation is attached to the value of the threshold TH as long as enough electrical energy has been stored by the transmitting device D_TX to transmit the information message MESS_INFO.

For the remainder of the description, it is considered that, in the embodiment of FIG. 1, the transmission of said message MESS_INFO is carried out by ambient backscatter. Consequently, the environment of the transmitting device D_TX includes an emitting device SO configured to emit, according to an emission frequency comprised in a given frequency band called "emission band", a radio signal called "ambient signal".

By "radio signal", reference is here made to an electromagnetic wave propagating by non-wired means, whose frequencies are comprised in the traditional spectrum of the radio waves (a few hertz to several hundred gigahertz).

By way of non-limiting example, the ambient signal is a 4G mobile phone signal emitted in the emission band [811 MHz, 821 MHz] by the emitting device SO. It should however be specified that the invention remains applicable to other types of radio signals, such as for example a mobile phone signal other than 4G (for example 2G, 3G, 5G), a Wi-Fi signal, etc. In general, no limitation is attached to the ambient radio signal that can be considered in the context of the present invention as long as the latter can be used to communicate by ambient backscatter.

In the embodiment of FIG. 1, the system 10 also includes a receiving device D_RX configured to perform processing operations allowing it to read the information message MESS_INFO as well as to notify at least one communication terminal UE of the content of said information message MESS_INFO, by implementing a communication method according to the invention.

For the remainder of the description, it is considered without limitation that the emitting device SO is a base station. It is also considered that the receiving device D_RX and the user terminal UE are both cellular phones, for example of the Smartphone type. More particularly, there is considered the configuration according to which:

the terminal UE belongs to a store employee who is responsible for the logistics of the department in which the physical element EM is sold (example: a department manager), the receiving device D_RX belongs to a customer present in the store and therefore likely to make one or more visits in the vicinity of the physical element EM (example: in the department in which the physical element EM is sold).

It should however be noted that no limitation is attached to the forms respectively taken by the emitting SO and receiving D_RX devices, as long as they are able to communicate with each other.

Thus, according to another example, the emitting device SO can correspond to a Smartphone, or a touch pad or a personal digital assistant, or a personal computer, etc., and the receiving device D_RX can correspond to a base station.

According to yet another example, the emitting device SO can correspond to a Wi-Fi terminal, and the receiving device D_RX can correspond to a Smartphone, or a touch pad, or a personal digital assistant, or a personal computer, etc., able to communicate according to the Wi-Fi protocol.

Of course, the form taken by the terminal UE is also irrelevant (Smartphone, touch pad, personal digital assistant, personal computer, etc.) for the implementation of the invention.

Furthermore, although the embodiment of FIG. 1 only mentions a single emitting device SO, a single receiving device D_RX and a single terminal UE, this is only an exemplary embodiment of the invention. Thus, nothing excludes envisaging, according to other examples not detailed here, a number of emitting devices strictly greater than 1 and/or a number of receiving devices greater than 1 and/or a number of communication terminals strictly greater than 1.

As mentioned above, the transmitting device D_TX is in particular configured to backscatter, on condition (i.e. as soon as the amount of stored electrical energy is greater than the threshold TH), the ambient signal emitted by the base station SO, so as to transmit the information message MESS_INFO which can then be received by the receiving device D_RX. In other words, the information message MESS_INFO is broadcast by means of a signal called "backscattered signal", obtained by ambient backscattering of the ambient signal emitted by the base station SO.

The transmission of the signal backscattered by the transmitting device D_TX is carried out by variation of the backscattering of the ambient signal, this variation being based on the possibility for the transmitting device D_TX to modify the impedance presented to an antenna fitted thereto (not represented in the Figures), as a function of the information message MESS_INFO to be transmitted.

More specifically, the transmitting device D_TX can be associated with operating states as a function of the impedance presented to the antenna with which it is fitted. For the remainder of the description, it is considered in a non-limiting manner that these states are a state called "backscattering" state (the transmitting device D_TX can backscatter the ambient signal), as well as an opposite state called "non-backscattering" state (the transmitting device D_TX cannot backscatter the ambient signal or, in other words, is "transparent" to the ambient signal). The impedance associated with the backscattering state typically corresponds to zero or infinite impedance, while the impedance associated with the non-backscattering state typically corresponds to the complex conjugate of the characteristic impedance of the antenna, in the considered propagation medium and at the considered frequency.

It is important to note that the invention is not limited to this ideal case in which only two states respectively perfectly backscattering and perfectly non-backscattering would be considered. Indeed, the invention also remains applicable in the case where two states (first state and second state) are not perfectly backscattering/non-backscattering, as long as the variation of the backscattered waves is perceptible by the receiving device D_RX which is intended to receive the information message MESS_INFO.

The information message MESS_INFO intended to be transmitted by means of the backscattered signal is conventionally encoded according to a set of symbols, comprising for example a symbol called "high" symbol (bit of value "1"), or a symbol called "low" symbol (bit with of "0"). The transmission of the information message MESS_INFO by variation of the ambient backscatter can therefore be carried out, in a manner known per se, by alternation between said backscattering and non-backscattering states, each of said states being dedicated to the transmission of a symbol of a particular type (for example high symbol for the backscattering state and low symbol for the non-backscattering state, or vice versa). In other words, the information message MESS_INFO is transported by modulation of the waves of the ambient signal (i.e. by retro modulation).

The processing operations aimed at backscattering said ambient signal are conventionally performed by the transmitting device D_TX by implementing a backscattering method (not represented in the figures) which is an integral part of the transmission method mentioned above. For this purpose, the transmitting device D_TX includes for example one or more processors and storage means (magnetic hard disk, electronic memory, optical disk, etc.) in which data and a computer program are stored in the form of a set of program code instructions to be executed to implement said backscattering method.

Alternatively or in addition, the transmitting device D_TX also includes one or more programmable logic circuits, of the FPGA, PLD, etc. type, and/or specialized integrated circuits (ASIC), and/or a set of discrete electronic components, etc. adapted to implement the backscattering method.

In other words, the transmitting device D_TX includes a set of means configured by software (specific computer program) and/or by hardware (FPGA, PLD, ASIC, etc.) to implement the backscattering method.

The receiving device D_RX, for its part, is configured to perform processing operations aimed at decoding the signal backscattered by the transmitting device D_TX, so as to obtain the information message MESS_INFO. The information message MESS_INFO is obtained by implementing a decoding method (not represented in the Figures) which is an integral part of the communication method mentioned above. To this end, the receiving device D_RX includes for example one or more processors and storage means (magnetic hard disk, electronic memory, optical disk, etc.) in which data and a computer program are stored, in the form of a set of program code instructions to be executed to implement said decoding method.

Alternatively or in addition, the receiving device D_RX also includes one or more programmable logic circuits, of the FPGA, PLD, etc. type, and/or specialized integrated circuits (ASIC), and/or a set of discrete electronic components, etc. adapted to implement the decoding method.

In other words, the receiving device D_RX includes a set of means configured by software (specific computer program) and/or by hardware (FPGA, PLD, ASIC, etc.) to implement the decoding method.

The specific aspects concerning the signal processing techniques for the transmission of data by ambient backscatter as well as the decoding of these data are known and for example detailed in the following document to which those skilled in the art can refer: "Ambient Backscatter Communications: A Contemporary Survey", N. Van Huynh, D. Thai Hoang, X. Lu, D. Niyato, P. Wang, D. In Kim, IEEE Communications Surveys & Tutorials, vol. 20, No. 4, pp. 2889-2922, Fourthquarter 2018.

Particularly, it is known that the possibility of transmitting data by ambient backscatter by the transmitting device D_TX depends on its distance from the source of the ambient signal, i.e. the base station SO. It is also known that the possibility of decoding a signal backscattered by the receiving device D_RX depends on its distance from the transmitting device D_TX at the origin of said backscattered signal. These aspects are not described in more detail here because they fall outside the scope of the present invention.

It is also noted that the base station SO, the transmitting device D_TX and the receiving device D_RX are distinct from each other. Such arrangements are conventional as regards the ambient backscatter communication technology.

Figure 2:
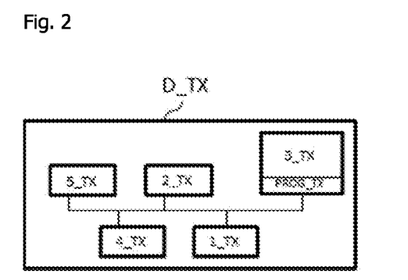
FIG. 2 represents an example of hardware architecture of a transmitting device belonging to the detection system of FIG. 1.

FIG. 2 schematically represents an example of hardware architecture of the transmitting device D_TX belonging to the system 10 of FIG. 1, for the implementation of steps of said transmission method.

As illustrated in FIG. 2, the transmitting device D_TX has the hardware architecture of a computer. Thus, the transmitting device D_TX includes, in particular, a processor 1_TX, a random access memory 2_TX, a read only memory 3_TX and a non-volatile memory 4_TX. It further includes a communication module 5_TX.

The read only memory 3_TX of the transmitting device D_TX constitutes a recording medium in accordance with the invention, readable by the processor 1_TX and on which a computer program PROG_TX in accordance with the invention is recorded, including instructions for the execution of steps of the transmission method according to the invention. The program PROG_TX defines functional modules of the transmitting device D_TX, which are based on or control the physical elements 1_TX to 5_TX of the transmitting device D_TX mentioned above, and which comprise in particular:
- a comparison module MOD_COMP configured to compare the amount of electrical energy stored with the threshold TH,
- a transmission module MOD_TX1 configured to transmit, when the amount of stored electrical energy is greater than the threshold TH, the information message MESS_INFO.

The communication module 5_TX allows in particular the transmitting device D_TX to communicate with the receiving device D_RX, and therefore integrates the means configured by hardware and/or by software to implement the backscattering method described above, these means themselves integrating said transmission module MOD_TX1.

As mentioned above, the electrical energy stored by the transmitting device D_TX is the one from which the transmission method is implemented. More particularly, in the context of the present embodiment, the comparison module MOD_COMP and the transmission module MOD_TX1 operate by using said stored electrical energy.

According to one particular exemplary embodiment, the comparison module MOD_COMP is of analog design. According to another example, the comparison module MOD_COMP is of digital design (i.e. as opposed to an analog design). In any case, whatever the type of design envisaged, those skilled in the art know how to carry it out, so that the amount of stored electrical energy can be compared with the threshold TH.

The fact of considering a comparison module MOD_COMP using the stored electrical energy makes it possible to envisage implementations involving an internal clock in the transmitting device D_TX, so that the transmission of the information message MESS_INFO is triggered only when the threshold TH is exceeded for a determined duration T1. As a variant or in addition, it can also be envisaged to stop the transmission of the information message MESS_INFO when the amount of stored energy falls below said threshold TH or another threshold TH_BIS for a duration equal to or different from T1. Such arrangements are advantageous in that they contribute to setting up a hysteresis that makes it possible to avoid triggering unwanted transmissions of messages.

For the remainder of the description, it is now considered without limitation that the comparison module MOD_COMP is of analog design (and operates by using the stored electrical energy, as already mentioned above).

It is however important to note that the present invention does not exclude envisaging that only the transmission module MOD_TX operates by using the stored electrical energy. In other words, nothing excludes envisaging other embodiments in which the operation of the comparison module MOD_COMP does not require the use of the stored electrical energy (nor, moreover, any other energy likely to be onboard and/or stored by the transmitting device D_TX). To this end, any means known to those skilled in the art able to carry out such other modes can be envisaged.

The fact of considering a comparison module MOD_COMP that does not use the stored electrical energy advantageously allows the transmitting device D_TX to be of simpler and less expensive design.

Figure 3:
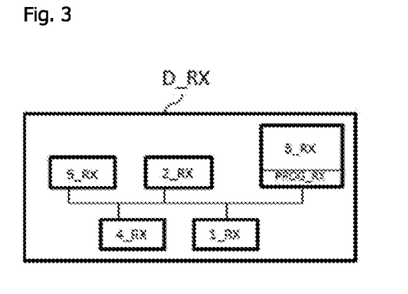
FIG. 3 schematically represents an example of hardware architecture of a receiving device belonging to the detection system of FIG. 1.

FIG. 3 schematically represents an example of hardware architecture of the receiving device D_RX belonging to the system 10 of FIG. 1.

As illustrated in FIG. 3, the receiving device D_RX has the hardware architecture of a computer. Thus, the receiving device D_RX includes, in particular, a processor 1_RX, a random access memory 2_RX, a read only memory 3_RX and a non-volatile memory 4_RX. It also includes a communication module 5_RX.

The read only memory 3_RX of the receiving device D_RX constitutes a recording medium in accordance with the invention, readable by the processor 1_RX and on which a computer program PROG_RX in accordance with the invention is recorded, including instructions for the execution of steps of the communication method according to the invention. The program PROG_RX defines functional modules of the receiving device D_RX, which are based on or control the physical elements 1_RX to 5_RX of the receiving device D_RX mentioned above, and which comprise in particular:
- a receiving module MOD_RX configured to receive the information message MESS_INFO,
- a transmission module MOD_TX2 configured to transmit, to the terminal UE, a message called "alert message" MESS_ALERT, representative of said threshold TH overrun.

The communication module 5_RX allows in particular the receiving device D_RX to communicate with the transmitting device D_TX, and therefore integrates the means configured by hardware and/or by software to implement the decoding method described above, these means themselves integrating said receiving module MOD_RX.

Furthermore, the communication module 5_TX is also configured to allow the transmitting device D_RX to communicate with the terminal UE, and for this purpose integrates said transmission module MOD_TX2. In the present embodiment, the exchanges between the transmitting device D_RX and the terminal UE taking place via a wireless communication interface according to any protocol known to those skilled in the art (Wi-Fi, Bluetooth, 3G, 4G, 5G, etc.). However, nothing excludes envisaging a wired communication interface (for example to use the Ethernet protocol).

The alert message MESS_ALERT is representative of the threshold overrun, and thus aims to warn the user of the terminal UE of the absence of the physical element EM. In other words, the action consisting in transmitting the alert message MESS_ALERT, from the receiving device D_RX to the terminal UE, can be seen as a relay of the information according to which the physical element EM is absent (or, in an equivalent manner, of the information according to which the transmitting device is in the "illuminated" state).

According to one particular exemplary embodiment, the alert message MESS_ALERT is representative of said threshold overrun and includes one or more characteristic data of the transmitting device D_TX. Said data correspond for example to an identifier or to a location of the transmitting device D_TX. Such data are for example initially encoded in the information message MESS_INFO (because known to the transmitting device D_TX), so that the receiving device D_RX can read it and relay it to the terminal UE.

Nothing excludes envisaging that other data are also encoded in the information message MESS_INFO, in addition to one or more characteristic data of the transmitting device D_TX. For example, it is possible to envisage a data indicating an instant at which said alert message MESS_ALERT is transmitted.

Such data make it possible to facilitate the identification of the transmitting device D_TX, and therefore a fortiori also that of the missing physical element EM. Indeed, within the framework of the embodiment considered here (sale in a store), the accurate identification of the absent physical element is facilitated by these data if several physical elements corresponding to one and the same model are offered for sale (example: several computer screens of the same model). The identification is all the more facilitated in the case where these elements corresponding to one and the same model are sold in several places of the store.

It should be noted that with regard to the content of the alert message MESS_ALERT representative as such of the threshold TH overrun, it may be identical to that of the information message MESS_INFO. However, nothing excludes envisaging a content that is different, as long as it is representative of said threshold TH overrun.

The transmission method (executed by the transmitting device D_TX) and the communication method (executed by the receiving device D_RX) are both implemented during the execution, by the system 10, of the method for detecting the absence of the physical element EM mentioned above. Said method for detecting the absence of the physical element EM can therefore be seen as a general method grouping together said transmission and communication methods.

Figure 4:
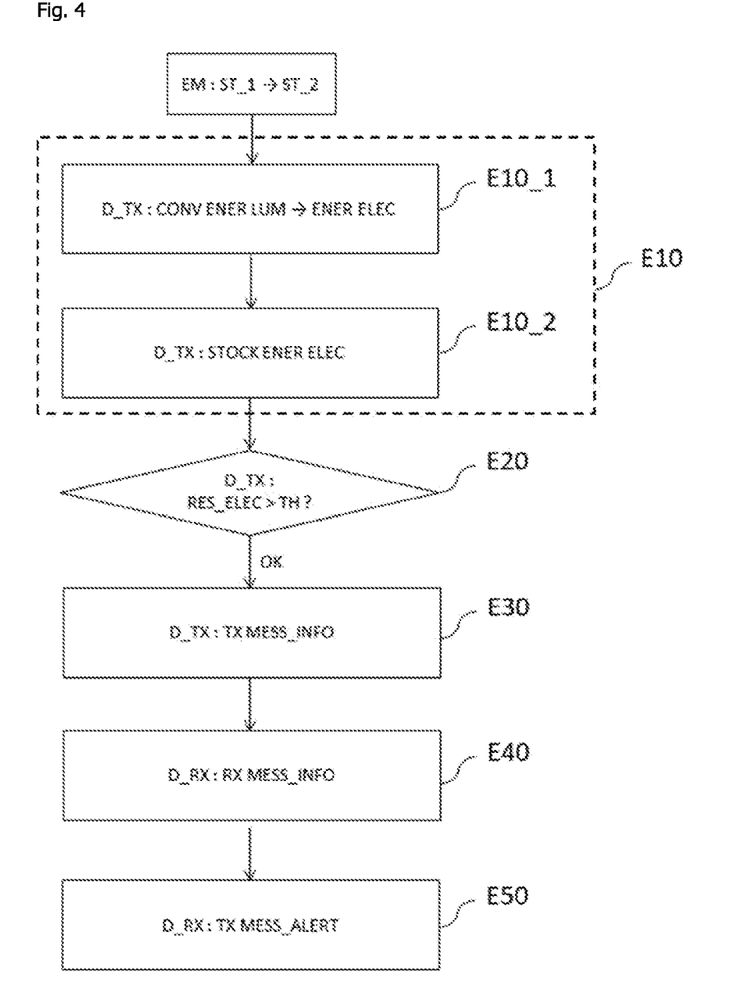
FIG. 4 represents, in the form of a flowchart, one particular embodiment of an absence detection method, as it is implemented by the transmitting device of FIG. 2 and the receiving device of FIG. 3.

FIG. 4 represents, in the form of a flowchart, one particular embodiment of the absence detection method, as implemented by the transmitting device D_TX in FIG. 2 and the receiving device D_RX in FIG. 3.

For the remainder of the description, it is considered that the physical element EM which was initially in the first state ST_1 (i.e. the physical element EM is present in the geographical area ZG, so that the transmitting device D_TX is masked) changes into the second state ST_2 (i.e. the physical element EM is absent in the geographical area ZG, so that the transmitting device D_TX is illuminated).

It is further assumed that the transition from the state ST_1 to the state ST_2 by the physical element EM takes place during the day, so that said two light sources (ambient lighting of the store, natural lighting) contribute to illuminating the transmitting device D_TX.

Due to said transition from the state ST_1 to the state ST_2 by the physical element EM, the absence detection method is triggered, and initially includes, as illustrated in FIG. 4, a step E10 of obtaining a stock of electrical energy RES_ELEC from light energy (i.e. from light energy coming from said two light sources). Said step E10 belongs to the transmission method and is implemented by the obtaining means 20 fitted to the transmitting device D_TX.

In more detail, said step E10 includes a sub-step E10_1 of converting the captured light energy into electrical energy ("CONV ENER LUM→ENER ELEC" in FIG. 4). Said sub-step E10_1 belongs to the transmission method and is implemented by the conversion means 21 fitted to the transmitting device D_TX.

Said step E10 further includes a sub-step E10_2 of storing said electrical energy ("STOCK ENER ELEC" in FIG. 4). Said sub-step E10_2 belongs to the transmission method and is implemented by the storage means 22 fitted to the transmitting device D_TX.

The detection method also includes a step E20 of comparing the amount of stored electrical energy RES_ELEC with the threshold TH. Said step E20 belongs to the transmission method and is implemented by the comparison module MOD_COMP fitted to the transmitting device D_TX.

When the amount of stored electrical energy RES_ELEC is greater than the threshold TH ("OK" in FIG. 4), the detection method includes a step E30 of transmitting the message MESS_INFO. Said step E30 belongs to the transmission method and is implemented by the transmission module MOD_TX1 fitted to the transmitting device D_TX. Of course, such arrangements also imply that as long as the amount of stored electrical energy RES_ELEC is not sufficient to allow a transmission of the message MESS_INFO (or possibly a transmission of sufficient quality), the latter is not transmitted.

The detection method also includes a step E40 of receiving the information message MESS_INFO. Said step E40 belongs to the communication method and is implemented by the receiving module MOD_RX fitted to the receiving device D_RX.

For the record, it is considered for the present mode of implementation, the information message MESS_INFO is transmitted by ambient backscatter of the ambient signal emitted by the base station SO. Consequently, the transmission step E30 (respectively the receiving step E40) implements the processing operations of the backscattering method (respectively the processing operations of the decoding method) described above.

In the mode of implementation of FIG. 4, the detection method also includes a step E50 of transmitting, to the terminal UE, the alert message MESS_ALERT. Said step E50 belongs to the communication method and is implemented by the transmission module MOD_TX2 fitted to the receiving device D_RX.

Thus, once the alert message MESS_ALERT is received by the terminal UE, the user in possession of said terminal UE is informed of the absence of the physical element EM, and can decide to set up appropriate actions. Such actions correspond, for example, to:
- a replacement of the physical element EM if the copy until then present in the geographical area ZG (i.e. present on the racks) has been sold and the stocks available to the store allow this replacement to be made,
- an investigation as to the reasons having led to the absence of said physical element EM, it being understood that the latter has not been sold,
- etc.

The invention has been described so far by considering that an alert message MESS_ALERT is transmitted from the receiving device D_RX to the terminal UE. It is nevertheless possible to envisage other embodiments, in which the receiving device D_RX is considered to be the only communication terminal receiving a message. In this case, the message in question is therefore said information message MESS_INFO which can, for example, be identical to the alert message MESS_ALERT described previously (i.e. the information message MESS_INFO can comprise, in addition to the content representative of the threshold TH overrun, one or more data, such as an identification data, a location data, a time data, etc.). It is also understood that for these other embodiments, the detection method includes the steps E10 to E40 already described, but on the other hand does not include the step E50.

Such arrangements can be illustrated by using the example described above with reference to FIG. 1, and for which it is considered that the physical element EM is an object sold in a store. Thus, it is possible to consider that the receiving device D_RX is a communication terminal belonging to the department manager, and that the latter can be notified of the absence of the physical element EM by moving around the store, more particularly in the vicinity of the transmitting device D_TX. In other words, unlike the example described above, the transmission of a message allowing the detection of the absence of the physical element EM is not carried out via a relay by a receiving device D_RX in possession of a customer of the store.

Furthermore, the invention has also been described so far by considering that the transmission of the information message MESS_INFO is carried out by ambient backscatter. However, nothing excludes envisaging other transmission modes, particularly modes in which the transmission of the information message MESS_INFO is carried out by emission of a radio signal. In other words, in such modes, the transmitting device D_TX is configured to emit a radio signal that forms the information message MESS_INFO transmission medium, which contrasts with communications implemented by ambient backscatter in which no additional wave (compared to those emitted by the source of the ambient signal) is generated.

No limitation is attached to the frequency of the radio signal emitted by the transmitting device D_TX in these embodiments, as long as the transmitting device D_TX and the receiving device D_RX are able to communicate with each other at this frequency. By way of non-limiting example, said radio signal is a mobile phone signal (for example 2G, 3G, 4G, 5G), a Wi-Fi signal, etc.

It should be noted that, here again, the information message MESS_INFO can be relayed, via the receiving device D_RX (example: a base station), to one or more communication terminals (example: one or more mobile phones belonging to users). Alternatively, the receiving device D_RX is considered to be the only communication terminal receiving the information message MESS_INFO (i.e. no relay is implemented).

It can also be noted that the detection system 10 has been described so far as including the transmitting device D_TX and the receiving device D_RX. That said, nothing excludes envisaging modes in which the system 10 still includes other elements.

Thus, in the case of a transmission of the information message MESS_INFO by ambient backscatter, the system 10 can for example also include the emitting device SO and the detection method can include a step of emitting the ambient signal and/or one or more communication terminals UE.

Alternatively or in addition, and independently of the mode of transmission of the information message MESS_INFO (ambient backscatter or emitted radio signal), the system 10 can for example also include, when an alert message MESS_ALERT is transmitted by the receiving device D_RX, one or more communication terminals such as the terminal UE described with reference to FIG. 1. Therefore, the detection method can include a step of receiving the alert message MESS_ALERT by each of said communication terminals.

With regard to the application context of the invention, the only configuration considered so far is the one according to which the physical element EM is the only object disposed on the shelf ETA in the geographical area ZG. It is nevertheless understood that the invention also covers similar configurations, for example in the case where several physical elements of the same type are arranged one behind the other on the shelf ETA, so as to form a row of physical elements. In this case, the detection method according to the invention makes it possible to detect the absence of the last physical element of the row, which means in particular that all the other physical elements preceding it in the row are also absent (example: cereal boxes are arranged one behind the other on a shelf of a grocery store and, when the cereal box closest to the transmitting device D_TX is sold, this means that there are no more cereal boxes on the shelf).

Of course, the invention also covers configurations in which the physical element is not an object sold in a store. For purely illustrative purposes, the invention may apply in the following cases:
- the physical element is a painting disposed in a museum (the transmitting device D_TX is then fixed to the wall, behind the painting), so as to be able to detect a possible theft of said painting,
- the physical element corresponds to the content of a package (the transmitting device D_TX is fixed in the bottom of the package), so as to be able to detect the proper delivery or the theft of said content,
- the physical element is an opening/detachable/dismountable part of an object, such as a letterbox door/an electrical cabinet door (the transmitting device D_TX is then fixed in the bottom of the letterbox/electrical cabinet, etc.), so as to be able to detect the (accidental, malicious, etc.) opening of said object,
- the physical element is a front case of a Smartphone (the transmitting device D_TX is then fixed inside the Smartphone, at the level of the rear case), so as to be able to detect that the Smartphone has been opened, which may have consequences in terms of warranty, the physical element is a vehicle, such as a car parked in a parking space (the transmitting device D_TX is fixed to the ground, in the area defined by the parking space), so as to be able to detect whether said parking space is free or occupied.

Even more generally, the invention also covers configurations in which the physical element is not an object that can be manufactured, but corresponds for example to:

a natural person. For example, the transmitting device is fixed to a seat intended to be occupied by said natural person for a given period (example: a ski lift seat, an armchair in a work office, etc.), so as to be able to monitor the occupation of said seat, raw physical matter. For example, the physical element corresponds to snow in a delimited geographical area in front of a post. The transmitting device D_TX is fixed on said post, at a determined height, so as to be able to detect the level of snow cover according to the accumulation or melting of snow.

An exemplary aspect of the present disclosure overcomes all or part of the drawbacks of the prior art, in particular those set out above, by proposing a solution which makes it possible to detect the absence of a given physical element in a determined geographical area, in a simpler way which is more energy efficient, more respectful of privacy and less expensive than the solutions of the state of the art.

Although the present disclosure has been described with reference to one or more examples, workers skilled in the art will recognize that changes may be made in form and detail without departing from the scope of the disclosure and/or the appended claims.

The invention claimed is:

1. A method comprising:
transmitting a message, said transmitting being implemented by a transmitting device and comprising:
in response to said transmitting device changing from a first state in which the transmitting device is deprived from illumination to a second state in which the transmitting device is illuminated by at least one light source:
obtaining an amount of electrical energy stored from light energy,
comparing the amount of electrical energy stored with a given threshold, said threshold representing an electrical energy quantity sufficient to allow transmission of a message by ambient backscattering, and
in response to said threshold being overrun, transmitting message, which is called "information message", representative of said threshold overrun, said transmission being implemented by ambient backscattering and using the stored electrical energy.

2. The method according to claim 1, wherein the comparing is also implemented by using the stored electrical energy.

3. The method according to claim 1, comprising:
detecting absence of a given physical element in a determined geographical area, said physical element being able to be associated with two distinct states:
a first state in which the physical element is present in the geographical area so that a transmitting device is deprived of illumination coming from at least one given light source,
a second state in which the physical element is absent from the geographical area so that the transmitting device is illuminated by at least one light source among said at least one light source,
wherein the detecting is implemented in response to the physical element changing from the first state to the second state and includes:
implementing the transmitting of the information message, and
receiving said information message by at least one receiving device.

4. The method according to claim 3, said method further including, following the receipt of the information message, transmitting, to at least one communication terminal, a message called "alert message", representative of said threshold overrun.

5. A communication method implemented by a receiving device and comprising:
receiving an ambient backscattering message called "information message", representative of an overrun of a given threshold by an amount of electrical energy stored by a transmitting device, said information message being transmitted by said transmitting device, and
transmitting, to at least one communication terminal, a message called "alert message", representative of said threshold overrun.

6. The method according to claim 5, wherein the alert message includes at least one characteristic data of the transmitting device.

7. The method according to claim 6, wherein said at least one data corresponds to an identifier or to a location of the transmitting device.

8. A transmitting device including:
a transmitter;
at least one processor; and
at least one non-transitory computer readable medium comprising instructions stored thereon which when executed by the at least one processor configure the transmitting device to:
obtain an amount of electrical energy stored from light energy,
compare the amount of electrical energy stored with a given threshold, and
transmit, with the transmitter, in response to the amount of stored electrical energy being greater than said threshold, a message called "information message", representative of said threshold overrun, by ambient backscattering and using the stored electrical energy.

9. The transmitting device according to claim 8, wherein the comparing is also performed by using the stored electrical energy.

10. A receiving device including:
a receiver;
at least one processor; and
at least one non-transitory computer readable medium comprising instructions stored thereon which when executed by the at least one processor configure the receiving device to:
receive, with the receiver, an ambient backscattering a message called "information message", representative of an overrun of a threshold given by an amount of electrical energy stored by a transmitting device, said information message being transmitted by said transmitting device, and
transmit, to at least one communication terminal, a message called "alert message", representative of said threshold overrun.

\* \* \* \* \*